Figure 1:
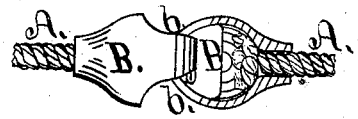

G. D. HAWORTH.
Check-Row Cord for Corn-Planters.

No. 159,177. Patented Jan. 26, 1875.

Witnesses
Michael Dempsey
J. S. Dempsey

Inventor
George D. Haworth
Per. Levi P. Graham
Att'y

UNITED STATES PATENT OFFICE.

GEORGE D. HAWORTH, OF DECATUR, ILLINOIS.

IMPROVEMENT IN CHECK-ROW CORDS FOR CORN-PLANTERS.

Specification forming part of Letters Patent No. 159,177, dated January 26, 1875; application filed June 13, 1874.

*To all whom it may concern:*

Be it known that I, GEORGE D. HAWORTH, of Decatur, in the county of Macon and State of Illinois, have invented certain new and useful Improvements in Check-Row Cords for Corn-Planters, of which the following is a specification:

My invention consists in an improved stop, an adjustable coupling, and a stop and swivel combined, which, together with pieces of cord of suitable length and caliber, combine to produce a "check-row" cord with the following advantages: First, it is not liable to wear or break at the stops. Second, it neutralizes any excess of torsion which may be accumulated through the rolling motion imparted to it by pulleys of the check-rower or by other means. Third, it can be readily disconnected to avoid an obstruction, to remove and replace an injured part, and to regulate the length to correspond with the field to be planted.

In the drawing, A represents a section of cord. B is an annular piece of metal concaved and furnished with tapering projections $b\ b$. C is an adjustable coupling, and D is a swivel turning in the concavity of B.

Figure 2:
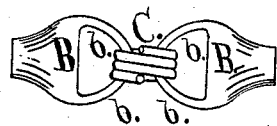
Figure 3:
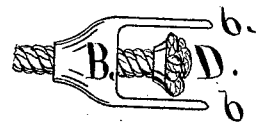
Figure 4:

Figure 1 represents my stop with one-half broken to show the termination of the cord. Fig. 2 shows stop and adjustable coupling. Fig. 3 represents B, with projections $b\ b$, as they appear before being closed, also the cord pushed through to show swivel D. Fig. 4 is an end view of B, with projections closed.

My stop is composed of two pieces, B B, with the projections of each pressed together in such a manner as to inclose the projections of the other, thus forming a universal-joint coupling, which will admit of an angle as small as ninety degrees.

This arrangement permits the cord to operate in the pulleys of the check-rower without bending at its junction with the stop, more than enough flexibility being furnished by the coupling above specified.

The swivel, Fig. 3, is to neutralize an excess of torsion, as above specified, and may be placed about eight or ten rods apart.

The adjustable coupling shown in Fig. 2 is composed of two separate pieces, B B, connected with an open ring, or other known and similar device, that may be readily attached or detached. I prefer to use them about as frequent as the swivel.

The cord is attached to the stop by being pushed through from the convex side, and a knot formed on it large enough to fill the concavity of B.

The knot may be formed in various ways, but at present I prefer to separate the strands of the cord, select two opposite ones, and tie them over the others.

Having thus described my invention, what I claim as new, and desire to secure by Letters Patent, is—

1. The flexible stop B B $b\ b\ b\ b$ on a check-row cord, substantially as and for the purpose set forth.

2. The combination, in a check-row planter, of stop B B $b\ b\ b\ b$ with swivel D and cord A, as and for the purpose set forth.

3. The combination, in a check-row planter, of stop B B $b\ b\ b\ b$, swivel D, connecting-ring C, and cord A, all constructed to operate in the manner and for the purpose set forth.

GEO. D. HAWORTH.

Attest:
H. W. WAGGONER,
LEVI P. GRAHAM.